Figure 1:
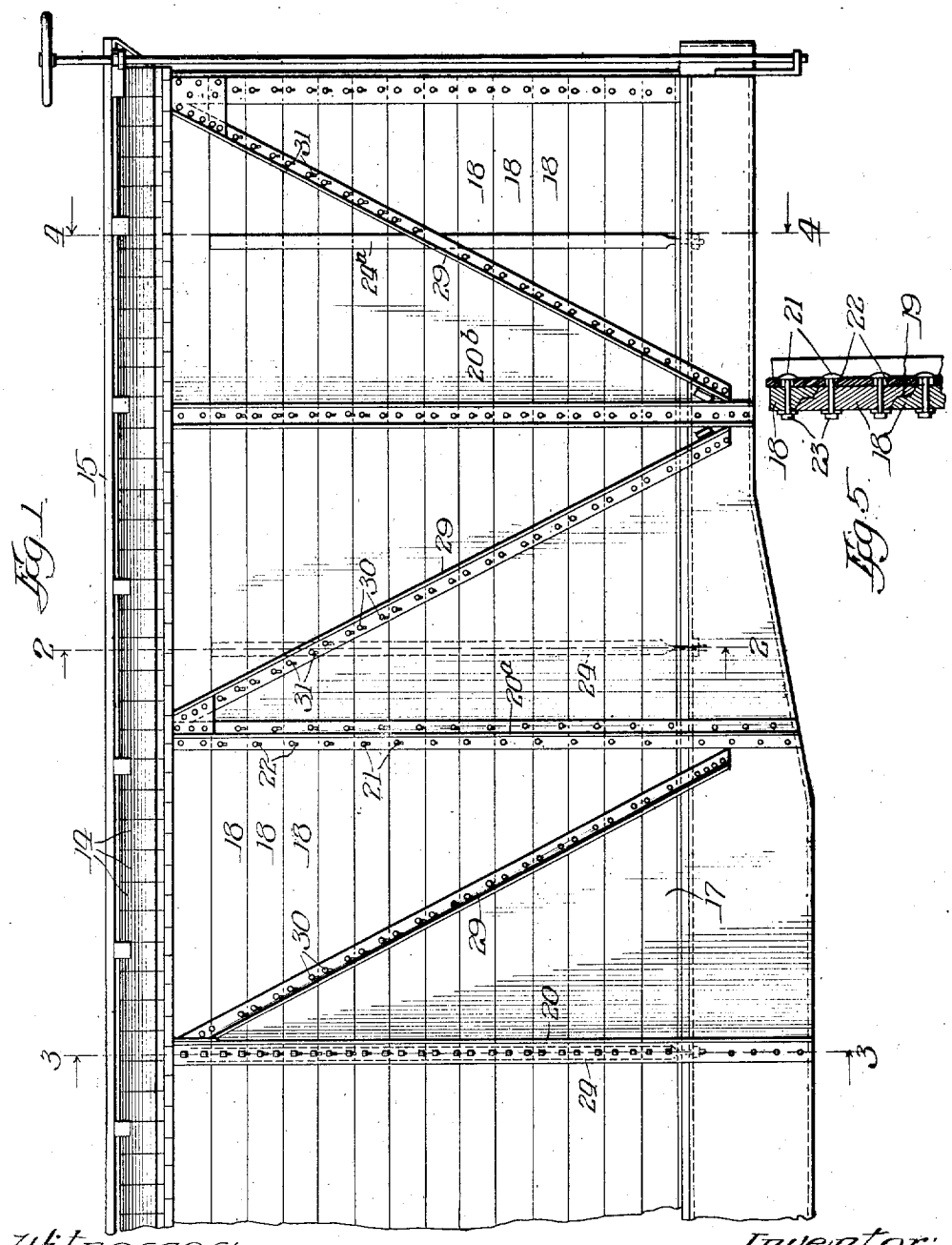

W. E. FOWLER.

BOX CAR.

APPLICATION FILED MAR. 24, 1913.

Reissued May 13, 1913.

13,561.

3 SHEETS—SHEET 1.

Witnesses:

Geo. C. Rarious

Chas. F. Morrow

Inventor:

William E. Fowler,

By Arthur C. Bull

Atty's.

W. E. FOWLER.

BOX CAR.

Reissued May 13, 1913. APPLICATION FILED MAR. 24, 1913.

13,561.

3 SHEETS—SHEET 2.

Witnesses:
Geo. C. Lawson
Chas. F. Murray

Inventor:
William E. Fowler
By Lothrop, Belt & Walker
Attys.

W. E. FOWLER.

BOX CAR.

APPLICATION FILED MAR. 24, 1913.

Reissued May 13, 1913.

13,561.

3 SHEETS—SHEET 3.

Witnesses:
Fred C. Davison
Chas. F. Murray

Inventor
William E. Fowler.
By Lathrum Bell & Bulle
Attys

UNITED STATES PATENT OFFICE.

WILLIAM E. FOWLER, OF CHICAGO, ILLINOIS, ASSIGNOR TO THE FOWLER CAR COMPANY, A CORPORATION OF ILLINOIS.

BOX-CAR.

13,561. Specification of Reissued Letters Patent. Reissued May 13, 1913.

Original No. 962,425, dated June 28, 1910, Serial No. 441,550. Application for reissue filed March 24, 1913. Serial No. 756,595.

*To all whom it may concern:*

Be it known that I, WILLIAM E. FOWLER, a citizen of the United States, residing at Chicago, in the county of Cook and State of Illinois, have invented certain new and useful Improvements in Box-Cars, of which the following is a specification.

This invention relates to a novel construction of box cars, and has for its general object to simplify, lighten and cheapen the construction of box cars, and more particularly the side walls and floors thereof, by doing away with the necessity for double-sheathing at present extensively employed, especially in grain cars; a further important object being to provide a means for counteracting the effects of shrinkage and preventing the formation of cracks at the points between the planks; and to these ends my invention employs to some extent the general constructional features of the side walls of wooden gondola car bodies in which are used horizontally arranged superposed side-planks bolted to vertical stakes mounted on the side-sills, with side-plank tie-rods and tie-straps passing through or bolted across the series of side-planks.

In carrying out my invention as applied to the side walls, I employ as the sole filling elements or sheathing thereof a series of superposed horizontally arranged narrow side-planks preferably formed with overlapping offset or other similar matching joints, which side-planks are bolted to metal stakes disposed at intervals along the outer sides of the walls; while, as a means for drawing the side-planks together to prevent the formation of cracks at the joints as well as to counteract shrinkage of the side-planks and render the joints tight, I employ a novel device in the nature of a tightening-strap, which, in its preferred form, is characterized by a hook or equivalent device at its upper end which engages over the upper edge of one of the series of side-planks—preferably the topmost, and a threaded lower end which passes through an anchorage below the side wall and receives a nut for securing and adjusting purposes.

In the preferred form of the invention herein illustrated the side-sills of the car-body are of the inwardly-facing channel form, and the lower threaded ends of the tightening-straps pass through the car-floor and the upper flanges of said side-sills and are secured to the latter by nuts on their lower ends. The same general principle of construction is involved in the application of the invention to the floors, a single thickness of planking being employed, the planks having matching or offset joints, and being secured to the floor sills by bolts provided with sufficient lateral play in said floor sills to allow the entire series of floor-planks to be forced together edgewise to close any cracks that may occur at the joints between adjacent planks due to shrinkage or other causes.

My invention will be readily understood when considered in connection with the accompanying drawings illustrating simple mechanical embodiments thereof, in which,—

Figures 2, 3, 4, 6, 7, 8:
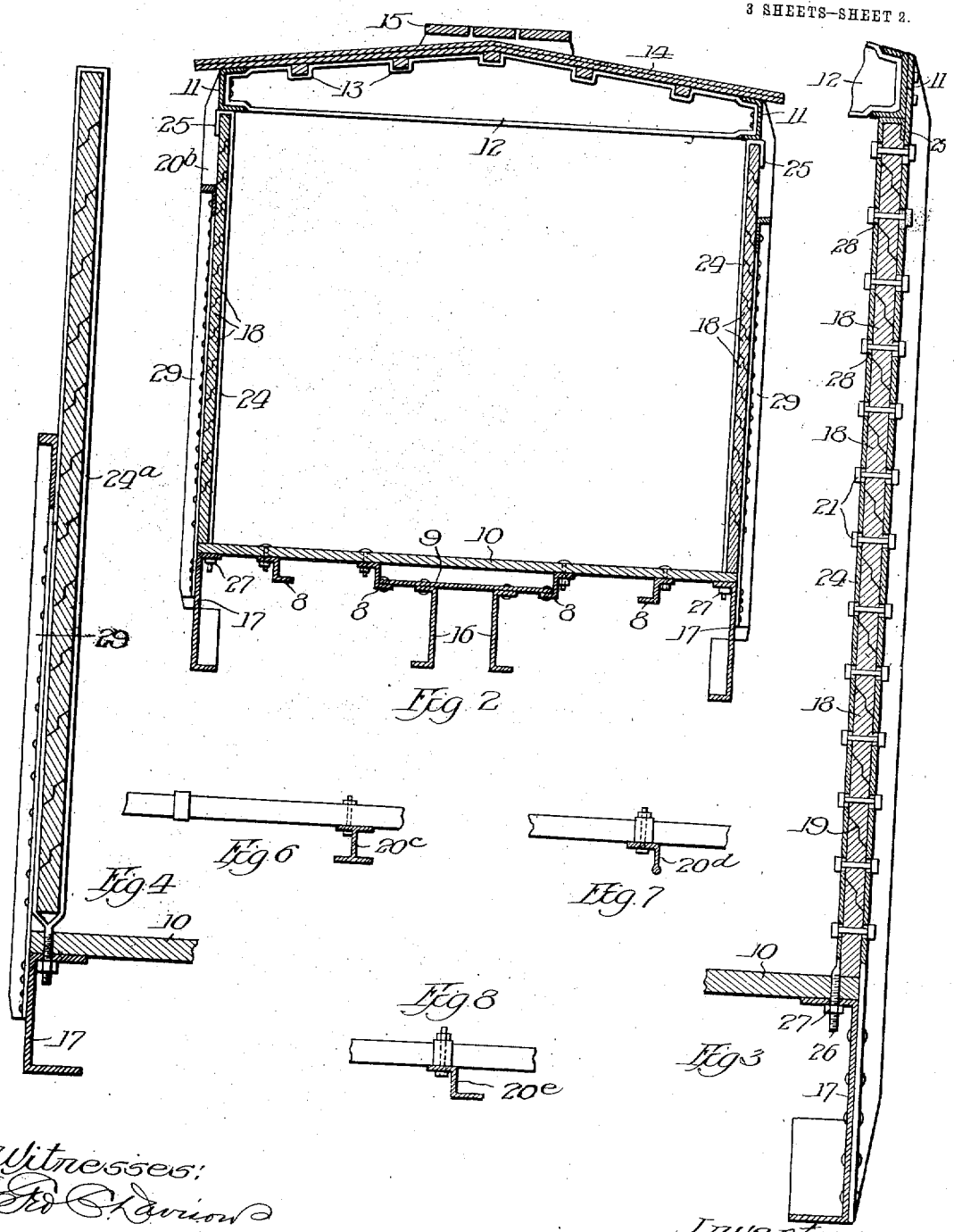
Figure 9:
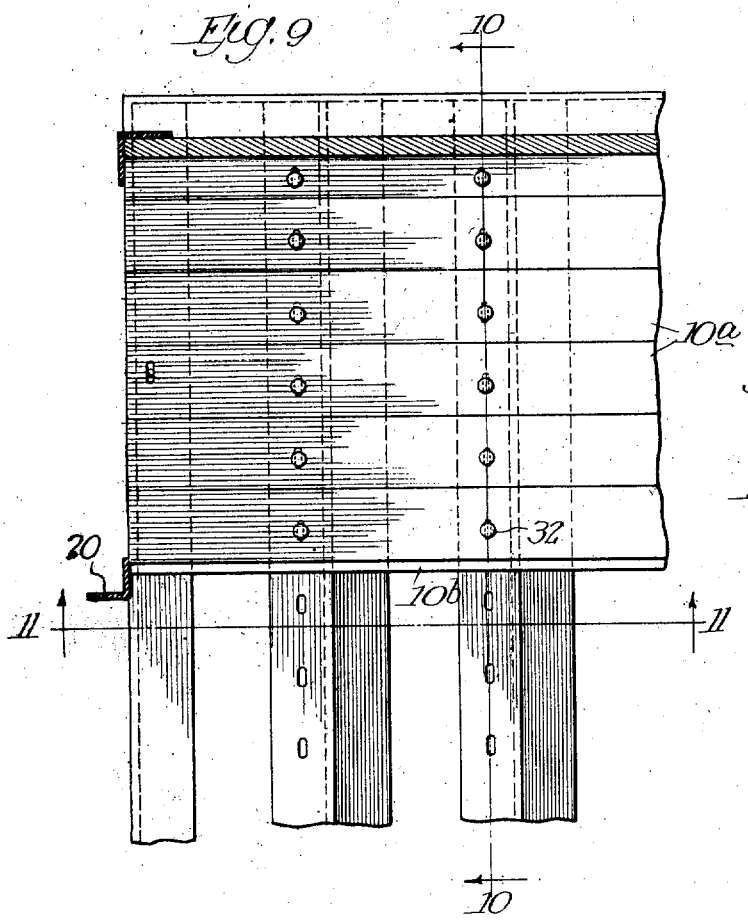
Figure 10:
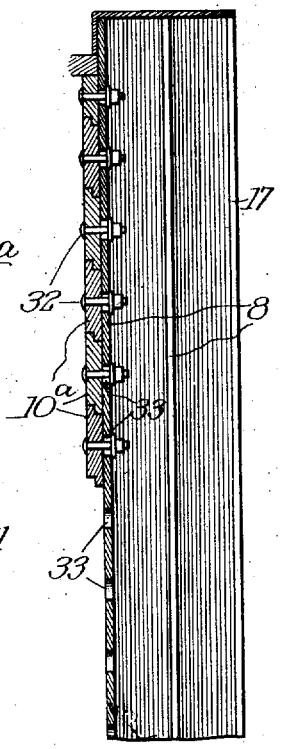
Figure 11:
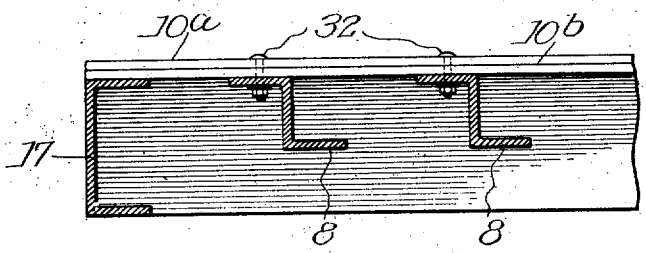

Figure 1 is a fragmentary side elevation of one end of a box car showing my invention applied thereto. Fig. 2 is a vertical cross-section through the car-body on the line 2—2 of Fig. 1. Fig. 3 is a fragmentary transverse section, enlarged, on the line 3—3 of Fig. 1. Fig. 4 is a view similar to Fig. 3 on the line 4—4 of Fig. 1. Fig. 5 is a vertical sectional detail illustrating the manner of securing the stakes to the side walls to permit a tightening of the joints of the latter by the adjusting device of my invention. Figs. 6, 7 and 8 are top plan details in the plane of the upper edge of one of the car sides showing various forms of standard rolled steel stakes that may be employed in connection with my invention. Fig. 9 is an enlarged plan view of a portion of the car floor. Figs. 10 and 11 are sectional views on the lines 10—10, and 11—11, respectively, of Fig. 9, looking in the directions indicated by the arrows.

Referring to the drawings, 10 designates the floor, 11 the plates, 12 the carlines, 13 the purlins, 14 the roof boards, and 15 the running-board of a box car. Beneath the floor 10 are the center-sills 16 herein shown as a pair of outwardly facing steel channels, and side-sills 17 herein shown as a pair of inwardly facing steel channels of contracted width at their end portions, as shown in Fig. 1, and intermediate longitudinal floor sills 8 herein as of Z-beam form. Connecting the center sills and intermediate longitudinal floor sills is a plate 9.

In constructing the side walls, I employ as the sole sheathing or filling thereof a series of horizontally arranged superposed side-planks 18 preferably formed with oblique matching offset joints 19, which side-planks are secured to a series of upright stakes, which latter are bolted or riveted at their lower ends to the outer sides of the side-sills 17. These stakes are preferably steel bars of standard rolled forms, any of which having a member parallel with the plane of the side-planks and another member at an angle thereto for stiffening purposes may be employed. In Fig. 1 I have shown at 20 an angle-bar form of stake, at $20^a$ a T-form, and at $20^b$ a channel-form. In Fig. 6 I also show an I-form $20^c$, in Fig. 7 an angle-form $20^d$ provided with a bead on its outer edge, and in Fig. 8 a Z-form at $20^e$. These stakes, as shown in the detail view, Fig. 5, are secured to the side-planks by bolts 21 which pass through short vertical slots 22 in that member of the stake lying flat against the side-planks and through holes in the side-planks, being secured by nuts 23 on their inner ends. It will be observed that this construction affords to the side-planks a capacity for a limited vertical movement relatively to the stakes.

I have herein illustrated two forms of my improved tightening-strap, either or both of which may be employed to satisfactorily effectuate the purposes of the invention. In Figs. 1, 2 and 3 I show a tightening-strap 24 that extends transversely of the side-planks, lying snugly against the inner sides of the latter, and is provided at its upper end with an outwardly and downwardly turned hooked portion 25 that engages over the uppermost of the series of side-planks 18. The lower end of this tightening-strap is rounded and threaded, as shown at 26, and extends through a hole in the car-floor 10, and, where used in association with a steel side-sill having a laterally projecting upper flange, such as the channel-sill 17, likewise extends through an aperture in said upper flange and is secured by a nut 27 beneath said flange. The other form of tightening-strap illustrated in Figs. 1 and 4 differs from that above described in that the main body portion of the strap is formed as a complete elongated loop $24^a$ completely embracing the series of side-planks at the top, bottom, and on both sides, said tightening strap being secured at its lower end by the means and in the manner shown in Fig. 3. These tightening-straps may be applied to the side walls of the car at points between adjacent stakes, as shown at the center and at the right in Fig. 1 and in Fig. 2; or, they may be applied directly opposite a stake, as shown in Fig. 3 and at the left in Fig. 1: in which latter case the longitudinal member or members of the strap that engage the side-planks are, like the stakes, provided with narrow vertical slots 28 to receive the bolts 21.

From the foregoing it will be evident that by screwing up the adjusting nuts 27, the tightening-straps are drawn downwardly, thus drawing together the superposed series of the side-planks and rendering perfectly tight the joints between the latter. The vertical slotting of the stakes where the bolts 21 pass therethrough permits such downward adjustment of the side-planks; and the similar slotting of the tightening-straps 24, where located in the transverse planes of the stakes, likewise permits such downward movement of the tightening-straps in the adjustment. This adjustment not only produces a tight construction of side wall on the first instance, but, in case the side-planks shrink, thus tending to open the joints between them, such open joints can be easily and quickly closed by further adjustment of the tightening-straps.

Between the stakes may be applied the usual oblique braces 29 herein shown as of angle-bar formation secured to the horizontal planks of the sheathing by bolts 30; and to accommodate the contracting movement of the sheathing, the holes in the braces accommodating the bolts 30 are elongated vertically, as indicated at 31 in Fig. 1. In this connection it may be noted that, since the extent of downward movement of the planks 18 under the action of the tightening-straps is greatest at the top and diminishes to practically nothing at or near the bottom of the wall, the slotting of the stakes and braces will be greatest at or near the upper end and may diminish and disappear at or near the lower end of the wall. In Figs. 9, 10 and 11 I have illustrated the application of this principle to the floor construction of the car, although I have not shown the latter as equipped with the tightening-straps, since the tightening effect may be otherwise secured. Referring to these figures, it will be observed that the individual planks $10^a$ of which the floor is composed rest transversely of and upon the upper horizontal flanges of the longitudinal floor bars 8 and side sills 17 and are secured thereto by means of bolts 32, which pass through slots 33 formed in and longitudinally of the upper flanges of the floor beams. The planks are formed preferably with matching offset joints $10^b$, as shown: and, in the event of any shrinking of the floor planks such as would produce an objectionable crack between them, by simply slightly loosening the nuts on the securing bolts 32 and applying a crow-bar or similar tool to the end planks of the series or between any two of the planks, the latter may be forced into snug edgewise engagement, closing up any cracks that may occur at the matching joints; while the crack at the point where the tightening tool is applied may be filled in and closed in any suitable manner.

My invention is particularly useful in cars intended for the transportation of grain; and it is noteworthy that the tightening-straps not only serve at all times as a means for tightening the joints between the side-planks, but also materially reinforce the stakes in stiffening the side walls and maintaining them at all times against bulging and in true vertical planes, and obviating the necessity for double sheathing.

It will be evident that the same principle of construction can be applied to the end walls of the car as well as to the side walls and floors, if so desired; and it should be understood that the term "side wall" as herein used is intended to include the shorter sides or ends of the car, as well as the longer or longitudinal sides thereof.

I claim:

1. In a box car, the combination with a side wall composed of a series of superposed side planks, upright frame posts to which said planks are adjustably secured, of means for tightening said planks upon each other to take up shrinkage, substantially as described.

2. In a box car, the combination with a side wall composed of a series of superposed side planks having offset matching joints, upright frame posts to which said planks are adjustably secured, of means for tightening said planks upon each other to take up shrinkage, substantially as described.

3. In a box car, the combination with a side wall composed of a series of superposed side planks having oblique offset matching joints, upright frame posts to which said planks are adjustably secured, of means for tightening said planks upon each other to take up shrinkage, substantially as described.

4. In a box car, the combination with a side wall composed of a series of superposed side planks, upright frame posts to which said side planks are adjustably secured, of a tightening strap disposed transversely of and its upper end engaging one of said side planks, and means for drawing said tightening strap downwardly relatively to the side planks, substantially as described.

5. In a box car, the combination with the car floor, of a side wall composed of a series of superposed horizontal side planks, upright frame posts to which said side planks are adjustably secured, and a tightening strap disposed transversely of and at its upper end engaging one of said side planks, said tightening strap at its lower end extending through the car floor and provided with means for drawing the strap downwardly, substantially as described.

6. In a box car, the combination with the car floor, of a side wall composed of a series of superposed horizontal side planks, upright frame posts to which said planks are adjustably secured, and a tightening strap disposed transversely of and at its upper end engaging one of said side planks, the lower end of said tightening strap being threaded and extended through the car floor and provided with an adjusting nut, substantially as described.

7. In a box car, the combination with the car floor and side-sill, of a side wall composed of a series of superposed horizontal side planks, stakes secured to said side-sill, securing means between said stakes and side planks permitting a limited vertical adjustment of the latter, and tightening straps gaging at their upper ends one of said side planks and at their lower ends secured to said car floor with capacity for vertical adjustment, substantially as described.

8. In a box car, the combination with the car floor and side-sill, of a side wall composed of a series of superposed horizontal side planks, stakes secured to said side-sill, securing means between said stakes and side planks permitting a limited vertical adjustment of the latter, and tightening straps anchored at their upper ends over the topmost of said side-planks, said tightening straps at their lower ends being threaded and extended through the car floor and provided with adjusting nuts, substantially as described.

9. In a box car, the combination with the car floor and side-sill, of a side wall composed of a series of superposed horizontal side planks, slotted stakes secured to said side-sill and disposed across said side planks, securing bolts passed through the slots of said stakes and said side planks, and tightening straps anchored at their upper ends over the topmost of said side planks, said tightening straps at their lower ends being threaded and extended through the car floor and side-sill and provided below the latter with adjusting nuts, substantially as described.

10. In a box car, the combination with the car floor and side-sill, of a side wall composed of a series of superposed horizontal side planks, a slotted stake secured to said side-sill and disposed across one side of said side planks, a slotted tightening strap disposed across the other side of said side planks opposite said stake and engaging at its upper end one of said side planks and at its lower end adjustably secured to the underframe, and securing bolts passed through said side planks and the slots of said stake and tightening strap, substantially as described.

11. In a car, the combination with the underframe of floor planks laid thereon, and securing means for said floor planks permitting tightening of the latter to take up shrinkage, substantially as described.

12. In a car, the combination with the floor sills, of floor planks laid thereon, and fastening bolts engaging holes in one of said parts and slots in the other, thereby permitting tightening of said floor planks to take up shrinkage, substantially as described.

13. In a car, the combination with slotted floor sills, of floor planks laid thereon, and fastening bolts passed through said floor planks and the slots of said sills thereby permitting tightening of said floor planks to take up shrinkage, substantially as described.

14. In a car, the combination with slotted floor sills, of floor planks having offset matching joints laid thereon, and fastening bolts passed through said floor planks and the slots of said sills, thereby permitting tightening of said floor planks to take up shrinkage, substantially as described.

15. A box car side without interior framing, formed of planking placed edge to edge and finished to present an interior plane surface, and exterior corner and intermediate posts to which posts the planking is adjustably secured, whereby limited vertical tightening movement of the planking is permitted, substantially as described.

16. In a railway car, the combination of a car frame having posts, boards adjustably secured to said posts, and disposed edge to edge, and adjustable screw means acting on said boards, permitting closing of the cracks between the same due to shrinkage or the like, substantially as described.

17. A box car side of single thickness without interior framing, formed of planking placed edge to edge and exterior corner and intermediate posts, said posts being provided with slots, and bolts passing through said slots and the planking whereby to adjustably secure the planking to the posts and permit a limited vertical tightening movement of said side wall planking, substantially as described.

WILLIAM E. FOWLER.

Witnesses:

CHAS. F. MURRAY,

C. K. HUGHES.